United States Patent

Dölling

[11] Patent Number: 5,950,422
[45] Date of Patent: Sep. 14, 1999

[54] METHOD AND DEVICE FOR CONVERTING A POLLUTANT IN AN EXHAUST GAS IN A CATALYTIC CONVERTER

[75] Inventor: Winfried Dölling, Weissenbrunn, Germany

[73] Assignee: Seimens Aktiengesellschaft, Munich, Germany

[21] Appl. No.: 09/050,648

[22] Filed: Mar. 30, 1998

Related U.S. Application Data

[63] Continuation of application No. PCT/DE96/01768, Sep. 18, 1996.

[30] Foreign Application Priority Data

Sep. 29, 1995 [DE] Germany ............ 195 36 570

[51] Int. Cl.⁶ ............................................. F01N 3/00
[52] U.S. Cl. ................... 60/274; 60/277; 60/286
[58] Field of Search ............... 60/274, 286, 301, 60/277

[56] References Cited

U.S. PATENT DOCUMENTS

| | | | |
|---|---|---|---|
| 4,044,158 | 8/1977 | Goerlich | 60/274 |
| 4,403,473 | 9/1983 | Gladden | 60/274 |
| 4,656,829 | 4/1987 | Creps et al. | 60/277 |
| 5,021,227 | 6/1991 | Kobayashi et al. | 423/212 |
| 5,379,586 | 1/1995 | Honji et al. | 60/286 X |
| 5,522,218 | 6/1996 | Lane et al. | 60/274 |
| 5,560,200 | 10/1996 | Maus et al. | 60/274 |
| 5,626,014 | 5/1997 | Hepburn et al. | 60/277 X |
| 5,628,186 | 5/1997 | Schmelz | 60/274 |
| 5,649,420 | 7/1997 | Mukaihira et al. | 60/277 X |
| 5,740,676 | 4/1998 | Agustin et al. | 60/277 X |
| 5,751,602 | 5/1998 | Maus et al. | 60/274 X |
| 5,802,843 | 9/1998 | Kurihara et al. | 60/277 X |

FOREIGN PATENT DOCUMENTS

| | | |
|---|---|---|
| 0 498 598 A1 | 8/1992 | European Pat. Off. . |
| 33 37 793 C2 | 3/1988 | Germany . |
| 43 10 961 C1 | 3/1994 | Germany . |
| 43 15 278 A1 | 11/1994 | Germany . |
| 44 10 225 A1 | 9/1995 | Germany . |

OTHER PUBLICATIONS

Patent Abstracts of Japan No. 60–197225 (Hidemitsu), dated Oct. 5, 1985.
Patent Abstracts of Japan No. 58–098127 (Takeshi), dated Jun. 10, 1983.

*Primary Examiner*—John E. Ryznic
*Attorney, Agent, or Firm*—Herbert L. Lerner; Laurence A. Greenberg

[57] ABSTRACT

The invention relates to a method and to a device for using a reagent for converting a pollutant in an exhaust gas in a catalytic converter. The reagent is metered as a function of operational parameters of the exhaust gas and of a temperature of the catalytic converter. The reagent is added to the exhaust gas to form a mixture, and the mixture is fed through the catalytic converter. The temperature is determined recursively as a spatially and time-dependent function of the catalytic converter from the operational parameters of the exhaust gas and structural parameters of the catalytic converter. Catalytic activity in the catalytic converter is determined from the derived temperature and the reagent is metered as a function of the catalytic activity.

11 Claims, 3 Drawing Sheets

FIG.1

(1) $T_{1t} = T_{10} + [\dot{m}_{exhaust}\ t\ c_{exhaust}(T_{IN} - T_{10}) / (m_{k1}\ c_K)]$ (2) $T_{2t} = T_{20} + [\dot{m}_{exhaust}\ t\ c_{exhaust}(T_{1t} - T_{20}) / (m_{k2}\ c_K)]$ (3) $T_{3t} = T_{30} + [\dot{m}_{exhaust}\ t\ c_{exhaust}(T_{2t} - T_{30}) / (m_{k3}\ c_K)]$ (4) $T_{1T} = T_{1t} + [\dot{m}_{exhaust}\ T\ c_{exhaust}(T_{IN} - T_{1t}) / (m_{k3}\ c_K)]$ (5) $T_{2T} = T_{2t} + [\dot{m}_{exhaust}\ T\ c_{exhaust}(T_{1T} - T_{2t}) / (m_{k2}\ c_K)]$ (6) $T_{3T} = T_{3t} + [\dot{m}_{exhaust}\ T\ c_{exhaust}(T_{2t} - T_{3t}) / (m_{k3}\ c_K)]$

5,950,422

METHOD AND DEVICE FOR CONVERTING A POLLUTANT IN AN EXHAUST GAS IN A CATALYTIC CONVERTER

CROSS-REFERENCE TO RELATED APPLICATION

This is a continuation of International Application PCT/DE96/01768, filed Sep. 18, 1996, which designated the United States.

BACKGROUND OF THE INVENTION

FIELD OF THE INVENTION

The invention relates to a method and to a device for converting a pollutant in an exhaust gas in a catalytic converter using a reagent. The reagent is metered as a function of operational parameters of the exhaust gas and of a temperature of the catalytic converter and is added to the exhaust gas to form a mixture, and the mixture is fed through the catalytic converter. The device includes a reagent addition device for metering and adding a reagent to form a mixture with the exhaust gas which is then fed to the catalytic converter. The device also includes sensor elements for measuring operational parameters of the exhaust gas and a control unit for controlling the reagent metering as a function of the operational parameters and a temperature of the catalytic converter.

Such a method and such a device are disclosed by German Published, Non-Prosecuted Patent Application DE 43 15 278 Al, corresponding to U.S. Pat. No. 5,628,186, and German Patent DE 33 37 793 C2. According to each of these documents, which have a corresponding method or a corresponding device, a temperature measurement takes place in the catalytic converter. Operational parameters of the exhaust gas are additionally determined, in particular temperature, mass throughput, chemical composition and the like, and a reagent addition respectively required is controlled as a function of these parameters.

It is known to break down the nitrogen oxides resulting from fuel combustion in an internal combustion engine, after the addition of a reagent in the form of a reducing agent to the exhaust-gas flow which enters a downstream catalytic converter. Thus, nitrogen oxides are broken down in a reduction catalytic converter to nitrogen and water vapor by adding the reducing agent ammonia. The amount of reagent to be added must be matched accurately to the catalytic activity of the catalyst in order to avoid excess or deficit reagent.

For matching the amount of reducing agent to be added in the heat-up phase of a catalytic converter, German Patent DE 43 10 961 C1 discloses the use of a plurality of sensors for measuring temperatures inside of the catalytic converter, and, the provision of a matched addition of reducing agent taking into account the temperatures measured inside the catalytic converter, adapted to the catalytic activity of the sections of the catalytic converter upstream, between and downstream of the sensors. As a result, for example, a partial activation of the catalyst, already occurring in the heat-up phase, can be identified, and a matched amount of reducing agent can thereby be added even in the heat-up phase.

Furthermore it is known from Patent Abstracts of Japan No. JP 60 197225 to determine the temperature of the catalytic converter from the exhaust gas temperature at the inlet of the catalytic converter by the use of catalyst temperature simulators and to take it into consideration when determining the added amount of reducing agents with reference to the storage capacity of the catalytic converter.

SUMMARY OF THE INVENTION

It is accordingly an object of the invention to provide a method and a device for converting a pollutant in an exhaust gas in a catalytic converter, which overcome the above-mentioned disadvantages of the prior art devices and methods of this general type, in which the use of temperature sensors inside of the catalytic converter can be dispensed with, but with which the temperature-dependent catalytic activity of the catalyst, which is entirely absent at low temperatures, is taken into account.

With the foregoing and other objects in view there is provided, in accordance with the invention, a method for converting a pollutant in an exhaust gas in a catalytic converter using a reagent, which includes: metering a reagent as a function of operational parameters of an exhaust gas and a temperature of a catalytic converter; adding the reagent to the exhaust gas to form a mixture; feeding the mixture through the catalytic converter; determining the temperature recursively as a spatially and time-dependent function of the catalytic converter from the operational parameters of the exhaust gas and structural parameters of the catalytic converter; and determining catalytic activity in the catalytic converter as a spatially and time-dependent function from the temperature, and metering the reagent as a function of the catalytic activity.

To achieve the object relating to the method of the invention, the method converts a pollutant in an exhaust gas in a catalytic converter using a reagent. The reagent is first metered as a function of operational parameters of the exhaust gas and as a function of the temperature of the catalytic converter and is added to the exhaust gas to form a mixture. The mixture is fed through the catalytic converter, wherein the temperature is determined recursively as a spatially and time-dependent function of the catalytic converter from the operational parameters of the exhaust gas and configuration parameters of the catalytic converter. The catalytic converter is divided into subregions, which are successively exposed to the exhaust gas, and the temperature for each subregionl is determined separately, and catalytic converter activity is determined as a spatially and time-dependent function from the temperature and the reagent is metered as a function of the activity.

The method according to the invention requires no temperature measurement inside of the catalytic converter. Instead, the temperature inside of the catalytic converter, which is essential for assessing the catalytic activity of the catalyst, is determined within the framework of a recursive model which requires only operational parameters of the exhaust gas and configuration parameters of the catalytic converter which relate to and are thus, in particular, time-invariant. The calculations to be carried out within the framework of the model essentially have to reproduce heat flows between the catalyst and the exhaust gas as well as inside of the catalytic converter. Factors determining the heat flows are operational parameters of the exhaust gas which describe the supply of heat by the exhaust gas, and configuration parameters of the catalytic converter, in particular those parameters which determine its geometry and its mass, as well as specific parameters such as heat capacity and thermal conductivity. The model calculation is based on a predetermined temperature distribution inside the catalytic converter, which can be taken to be constant and equal to the temperature of the surroundings of the catalytic converter, in particular when the device emitting the exhaust gas is switched on. The model then determines the change in the temperature distribution with time as a function of the operational parameters. If the temperature inside of the catalytic converter is known, the catalytic activity of the catalyst can be determined as a spatially and time-dependent function from the temperature by use of a relationship, known per se, which should be experimentally checked, in each individual case, if appropriate. A matched value for the metering of the reagent into the exhaust gas can be calculated from the function, which matched value is, for example, selected in such a way that maximum conversion of the pollutant is achieved on condition that the reagent fed to the exhaust gas is fully converted in the catalytic converter.

The spatial dependence of the temperature in the catalytic converter is thereby determined in such a way that the catalytic converter is divided for the model into subregions which are exposed sequentially to the exhaust gas. The temperature for each subregion is determined separately. The determination of the temperature of a first subregion and the determination of the temperatures of subsequent subregions are preferably carried out according to specific formulas, which will be explained in more detail with the aid of an illustrative embodiment. On the basis of the temperature of each subregion, an associated catalytic activity of the subregion can be determined, and an overall catalytic activity of the catalytic converter is preferably taken to be the arithmetic mean of the catalytic activities of the subregions.

In particular, the method according to the invention provides that operational parameters of the exhaust gas are detected using sensor elements and forwarded to a control unit. The detected parameters and additional constant quantities in the form of configuration parameters of the catalytic converter, such as mass of catalyst, specific heat capacities of the catalyst and of the exhaust gas or air, are then used in the control unit for calculating the respective instantaneous catalytic activity of the catalyst.

In accordance with an added feature of the invention, there is the step of determining a mass flow and an entry temperature of the exhaust as the only operational parameters. Within the framework of the method, the mass flow of the exhaust gas flowing to the catalytic converter and the entry temperature at which the exhaust gas enters the catalytic converter are preferably the only operational parameters.

In accordance with another feature of the invention, there is the step of initiating a start of the method at an exposure of the catalytic converter to the exhaust gas, and the temperature of the catalytic converter being initially taken as constant and equal to an ambient temperature of the catalytic converter. Preferably, the method is initiated at the start of exposure of the catalytic converter to the exhaust gas.

As a function of the respective catalytic activity of the catalytic converter which is determined, the metering can be controlled using a reagent addition device, and exactly that quantity of reagent which can be converted at the instantaneous time in the catalytic converter can always be added.

It is not necessary to introduce one or more temperature sensors inside of the catalytic converter. Just the mass flow of exhaust gas and the entry temperature of the exhaust gas into the catalytic converter may advantageously be defined as operational parameters. With larger catalytic converters, the direct implication of this is significant simplification and a substantial reduction in susceptibility to faults.

By carrying out the procedural steps of measuring operational parameters, determining the catalytic activity, and controlling the metering at regular time intervals, the respective quantity of, reagent to be supplied can be matched accurately to the instantaneous catalytic activity of the catalyst.

Advantageously, the method, which can be carried out with an extremely low outlay of equipment, is used for optimizing the supply of reagent both in the heat-up and in the cool-down phase of the catalytic converter, even with positive and negative load step changes. The fluctuations in the exhaust-gas mass flow and the change in the entry temperature at which the exhaust gas enters the catalytic converter, which occur during such load step changes, are in turn used for calculating the instantaneous catalytic activity of the catalyst, with the result that the desired matching of the metering to the instantaneously increased or reduced load level is ensured.

In accordance with an additional feature of the invention, there is the step of dividing the catalytic converter into subregions being exposed sequentially to the exhaust gas, and in which the temperature for each subregion is determined separately.

In accordance with yet another added feature of the invention, there is the step of determining the temperature of a first subregion of the catalytic converter after a time interval according to the formula $$T_{1t}=T_{10}+[\dot{m}_{exhaust}  c_{exhaust}(T_{in}-T_{10})/(m_{K1}c_K)]$$

wherein $T_{10}$ is an initial temperature of the first subregion, $\dot{m}_{exhaust}$ is a mass flow of the exhaust gas, $C_{exhaust}$ is a specific heat capacity of the exhaust gas, $T_{in}$ is an entry temperature of the exhaust gas into the catalytic converter, $M_{K1}$ is a mass of the first subregion and $C_k$ is a specific heat capacity of a catalyst of the catalytic converter.

In accordance with yet another feature of the invention, there is the step of determining the temperature of each subregion through which the exhaust gas flows after the first subregion after a time interval according to the formula $$T_{it}=T_{i0}+[\dot{m}_{exhaust} c_{exhaust/air}(T_{i-1t}-T_{i0})/(m_{ki}c_k)]$$

wherein $T_{i0}$ is a temperature of the subregion at a starting time, $\dot{m}_{exhaust}$ is a mass flow of the exhaust gas, $C_{exhaust/air}$ is a specific heat capacity of the exhaust gas or air, $T_{i-1t}$ is a temperature of the previous subregion, $M_{ki}$ is a mass of the subregion and $C_k$ is a specific heat capacity of a catalyst of the catalytic converter.

In accordance with yet another additional feature of the invention, there is the step of determining the catalytic activity of a subregion on a basis of the temperature of the subregion.

In accordance with a further added feature of the invention, there is the step of determining an overall catalytic activity of the catalytic converter as an arithmetic mean of the catalytic activity of the subregion.

With the foregoing and other objects in view there is provided, in accordance with the invention, a device for converting a pollutant in an exhaust gas, including: a catalytic converter which has structural parameters to receive an exhaust gas; a reagent addition device to meter and add a reagent to the exhaust gas to form a mixture, the mixture is fed to the catalytic converter; sensor elements to measure operational relevant parameters of the exhaust gas; and a control unit to control the metering as a function of the operational relevant parameters of the exhaust gas and a temperature of the catalytic converter, the control unit has a memory for storing the structural parameters of the catalytic converter, the control device is configured for a recursive determination of the temperature as a spatially and time-dependent function of the catalytic converter, as a function of the operational relevant parameters and the structural parameters to determine catalytic activity in the catalytic converter as a spatially and time-dependent function and to meter the reagent as a function of the catalytic activity.

In order to achieve the object relating to the device, a device is provided for converting a pollutant in an exhaust gas. There is a reagent addition device for metering and adding a reagent to form a mixture with the exhaust gas, which is fed to a catalytic converter. Sensor elements are provided for measuring operational parameters of the exhaust gas and a control unit for controlling the metering as a function of the structural parameters and a temperature of the catalytic converter. The device has a control unit with a memory in which structural parameters of the catalytic converter are stored and is configured for the recursive determination of the temperature as a spatially and time-dependent function in the catalytic converter as a function of the operational parameters of the exhaust gas and the structural parameters of the catalytic converter, whereby the catalytic converter is divided into subregions. The subregions are successively exposed to the exhaust gas, and the temperature for each subregion is determined separately for determining an activity in the catalytic converter as a spatially and time-dependent function and for metering the reagent as a function of the activity.

The device according to the invention is distinguished by a low outlay of equipment and can fully dispensed with sensor elements for temperature determination disposed inside of the catalytic converter.

In accordance with an added feature of the invention, the sensor elements are provided for only measuring a mass flow of the exhaust gas and an entry temperature of the exhaust gas into the catalytic converter. In other words, the device just requires sensor elements for detecting the mass flow of the exhaust gas and the entry temperature of the exhaust gas into the catalytic converter.

In accordance with a concomitant feature of the invention, one of the sensor elements for measuring the mass flow is disposed upstream of the reagent addition device with respect to an exhaust-gas flow direction in order to avoid vitiation of the measurement result.

In the context of explaining the invention, reference has always been made to an "exhaust gas". However, this term should be understood not only to be an exhaust gas from a combustion process; the term is intended to refer to any polluted gas to be disposed of, that is to say contaminated outlet air from an industrial system as well.

Other features which are considered as characteristic for the invention are set forth in the appended claims.

Although the invention is illustrated and described herein as embodied in a method and a device for converting a pollutant in an exhaust gas in a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a listing of equations used for determining individual temperatures of a catalytic converter subdivided into three subregions;

DESCRIPTION OF THE PREFERRED EMBODIMENTS

Figure 3:
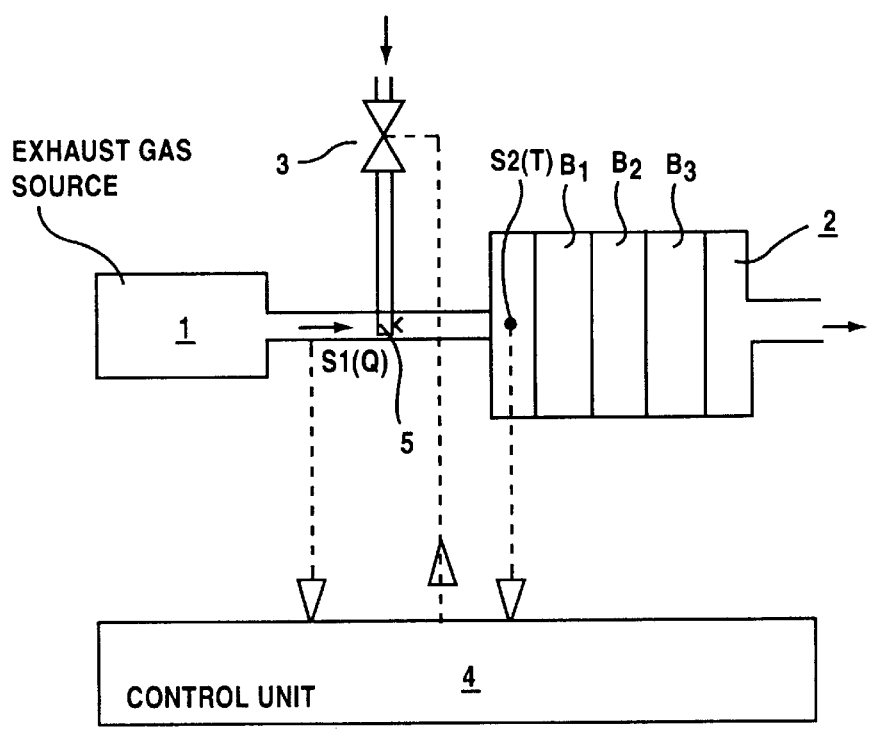
FIG. 3 is a diagrammatic schematic representation of a combustion system.
Figure 4:
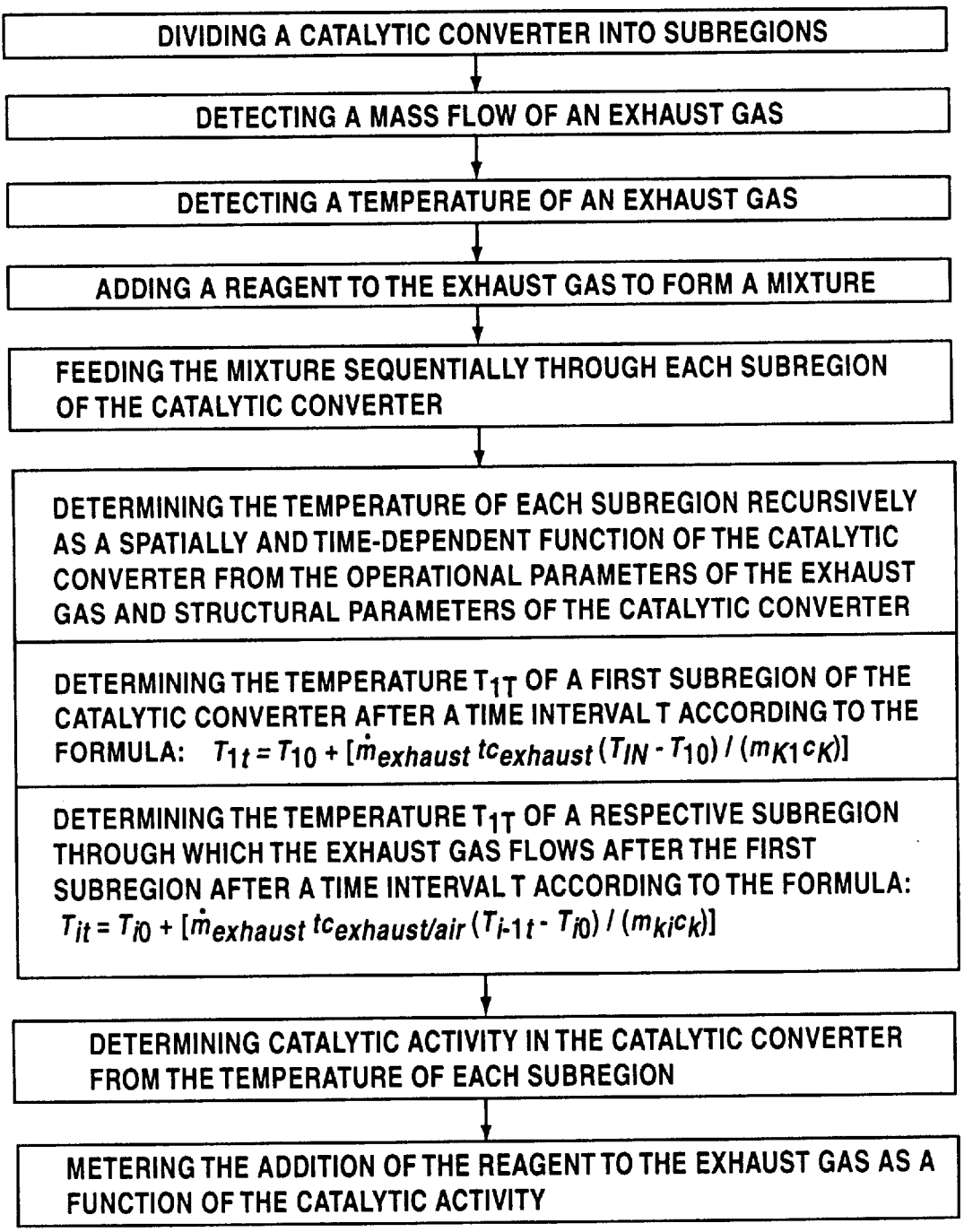
FIG. 4 is a flow chart showing an embodiment of the method of the present invention.

Referring now to the figures of the drawing in detail and first, particularly, to FIG. 1 thereof, there are shown a series of calculations used for determining individual temperatures of a catalytic converter subdivided into three subregions. On the basis of a catalytic converter 2 subdivided into three subregions $B_1$, $B_2$ and $B_3$ as shown in FIG. 3, the temperature $T_{1t}$ of a first subregion $B_1$ after a time interval t is first calculated according to equation (1) shown in FIG. 1. Equation (1) involves an initial temperature $T_{10}$ of the first subregion $B_1$ (which corresponds, for example, to an ambient temperature) and an entry temperature $T_{in}$ of an exhaust gas, detected by a corresponding sensor, and a mass flow $\dot{m}_{exhaust}$ of the exhaust gas, detected by a corresponding sensor. Other quantities involved are specific heat capacities $c_{exhaust}$ of the exhaust gas and $c_K$ of a catalyst, a mass $m_{k1}$ of the first subregion $B_1$ of a catalytic converter and the time interval t during which the measurement is taken.

The determined temperature $T_{1t}$ is then used, according to equation (2), for determining the temperature $T_{2t}$ of the catalytic converter region $B_2$. The calculation is made as according to equation (1), but with the difference that the temperature $T_{1t}$ of the first subregion $B_1$ of the catalytic converter is used instead of the entry temperature $T_{in}$ into the catalytic converter. In this case, it is assumed that the air leaving a catalytic converter part $B_{i-1}$, and entering the next catalytic converter part $B_i$ is at the temperature of the catalytic converter part $B_{i-1}$ through which it has just flowed. In addition, an initial temperature $T_{20}$ and a mass $m_{k2}$ of a second subregion $B_2$ is used instead of the first subregion values.

Figure 2:
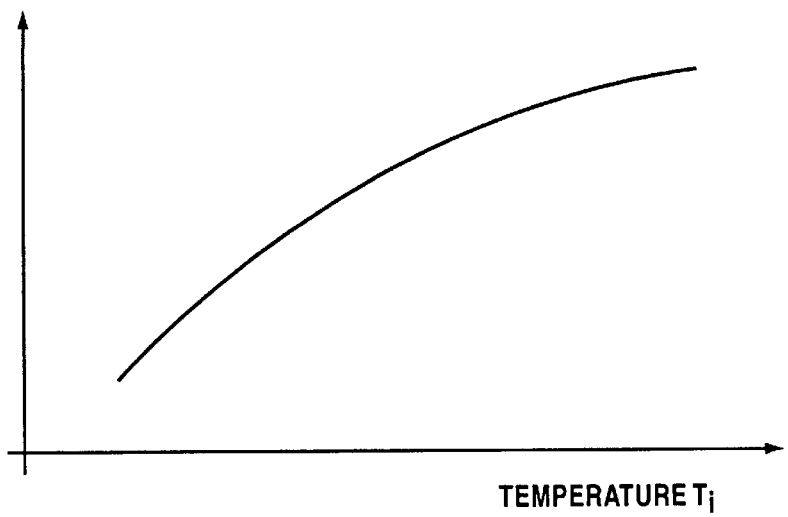
FIG. 2 is a graph for determining catalytic activity of a catalyst on the basis of a respective temperature of one of the three subregions.

After similar calculation of the temperature of the subregion $B_3$ according to equation (3), the temperatures $T_{1t}$, $T_{2t}$ and $T_{3t}$ of the individual subregions of the catalytic converter are provided after the time interval t, and the respective catalytic activity $k_{it}$ for each of the three subregions $B_1$, $B_2$ and $B_3$, can be determined according to FIG. 2. It is noted that an initial temperature $T_{30}$ and a mass $m_{k3}$ of a third subregion $B_3$ is used in equation (3).

By arithmetic averaging, according to the invention, of the individual catalytic activities $k_{1t}$, $k_{2t}$ and $k_{3t}$ of the individual subregions of the catalytic converter, an overall catalytic activity $K_t$ of the catalytic converter after the time interval t can be calculated, and the amount of reagent to be supplied to the exhaust gas can be matched.

After the time interval T (with T>t), the temperatures $T_{1T}$, $T_{2T}$ and $T_{3T}$ are again calculated according to equations (4) to (6), and the overall catalytic activity $K_T$ of the catalytic converter after the time interval T is found from the individual catalytic activities $K_{1T}$, $K_{2T}$ and $K_{3T}$, respectively.

The calculation cycle can be repeated as many times as desired. After the end of each calculation cycle, the amount of reagent to be added is matched to the respective overall catalytic activity (in the present case, $K_t$ or $K_T$).

To clarify the method further, the corresponding device has been shown schematically in FIG. 3. Starting with an exhaust-gas source 1 and a catalytic converter 2, the exhaust-gas mass flow is determined by sensor element S1 and the entry temperature of the exhaust gas into the catalytic converter 2 is established by the sensor element S2.

The determined sensor data are forwarded to a control unit 4 and are used in the manner described for calculating the overall catalytic activity of the catalytic converter 2 at the respective time. Thereupon, under the command of the control unit 4, the metered amount of reagent matched to the instantaneous overall catalytic activity $K_t$ is added.

The sensor element S1 for determining the mass flow of the exhaust gas is in an upstream position, relative to the exhaust-gas flow direction, from the point 5 where the reagent is input by a reagent addition device 3, in order to avoid vitiation of the measurement result because of the amount of reagent to be added.

In general, $M_{ki}$ refers to the mass of a respective subregion $B_i$, $T_{i0}$ refers to the temperature of a subregion $B_i$ at the starting time, $K_i$ refers to the catalytic activity of a subregion $B_i$, $T_{it}$ refers to the temperature of a subregion $B_i$ after the time interval t, and $T_{iT}$ refers to the temperature of the subregion $B_i$ after the time interval T.

I claim:

1. A method for converting a pollutant in an exhaust gas in a catalytic converter using a reagent, which comprises:
   detecting a mass flow of an exhaust gas;
   detecting a temperature of the exhaust gas entering a catalytic converter;
   adding a reagent to the exhaust gas to form a mixture;
   feeding the mixture through the catalytic converter;
   determining the temperature of the catalytic converter recursively as a spatially and time-dependent function of the catalytic converter from only the mass flow of the exhaust gas, the temperature of the exhaust gas entering the catalytic converter, and structural parameters of the catalytic converter;
   determining catalytic activity in the catalytic converter as a spatially and time-dependent function from the determined temperature of the catalytic converter; and
   metering the addition of the reagent to the exhaust gas as a function of the catalytic activity.

2. A method for converting a pollutant in an exhaust gas in a catalytic converter using a reagent, which comprises:
   dividing a catalytic converter into subregions;
   adding a reagent to an exhaust gas to form a mixture;
   feeding the mixture sequentially through each subregion of the catalytic converter;
   determining the temperature of each subregion recursively as a spatially and time-dependent function of the catalytic converter from operational parameters of the exhaust gas and structural parameters of the catalytic converter; and
   determining catalytic activity in the catalytic converter from the temperature of each subregion;
   and metering the addition of the reagent to the exhaust gas as a function of the catalytic activity.

3. The method according to claim 1, which comprises determining a mass flow and an entry temperature of the exhaust as the only operational parameters.

4. The method according to claim 1, which comprises initiating a start of the method at an exposure of the catalytic converter to the exhaust gas, and initially taking the temperature of the catalytic converter as constant and equal to an ambient temperature of the catalytic converter.

5. The method according to claim 1, which comprises determining the temperature $T_{1t}$ of a first subregion of the catalytic converter after a time interval t according to the formula $$T_{1t}=T_{10}+[\dot{m}_{exhaust}\, tc_{exhaust}(T_{in}-T_{10})/(m_{K1}c_K)]$$

wherein $T_{10}$ is an initial temperature of the first subregion, $\dot{m}_{exhaust}$ is a mass flow of the exhaust gas, $C_{exhaust}$ is a specific heat capacity of the exhaust gas, $T_{in}$ is an entry temperature of the exhaust gas into the catalytic converter, $M_{k1}$ is a mass of the first subregion and $C_k$ is a specific heat capacity of a catalyst of the catalytic converter.

6. The method according to claim 5, which comprises determining the temperature $T_{it}$ of a respective subregion through which the exhaust gas flows after the first subregion after a time interval t according to the formula $$T_{it}=T_{i0}+[\dot{m}_{exhaust}c_{exhaust/air}(T_{i-1t}-T_{i0})/(m_{ki}c_k)]$$

wherein $T_{i0}$ is a temperature of the respective subregion at a starting time, $\dot{m}_{exhaust}$ is a mass flow of the exhaust gas, $C_{exhaust/air}$ is a specific heat capacity of the exhaust gas or air, $T_{i-1t}$ is a temperature of a previous subregion, $M_{ki}$ is a mass of the respective subregion and $C_k$ is a specific heat capacity of a catalyst of the catalytic converter.

7. The method according to claim 1, which comprises determining the catalytic activity of each subregion on a basis of the temperature of each subregion.

8. The method according to claim 7, which comprises determining an overall catalytic activity of the catalytic converter as an arithmetic mean of each catalytic activity of the subregion.

9. A device for converting a pollutant in an exhaust gas, comprising:
   a catalytic converter divided into sequentially disposed subregions for sequentially receiving an exhaust gas, said catalytic converter having structural parameters;
   a reagent addition device for metering and adding a reagent to the exhaust gas to form a mixture fed to said catalytic converter;
   sensor elements for measuring operational parameters of the exhaust gas; and
   a control unit for controlling the metering as a function of the operational parameters of the exhaust gas, said control unit having a memory for storing said structural parameters of said catalytic converter, said control unit configured for a recursive determination of a temperature of each of said subregions as a spatially and time-dependent function of the operational parameters and said structural parameters, said control unit configured for a determination of catalytic activity in said catalytic converter from the determination of the temperature of each of said subregions, said control unit causing said reagent addition device to meter the reagent as a function of said catalytic activity.

10. The device according to claim 9, wherein said sensor elements are provided for only measuring a mass flow of the exhaust gas and an entry temperature of the exhaust gas into said catalytic converter.

11. The device according to claim 9, wherein one of said sensor elements for measuring the mass flow is disposed upstream of said reagent addition device with respect to an exhaust-gas flow direction.

* * * * *